United States Patent [19]
Lewis et al.

[11] Patent Number: 5,391,388
[45] Date of Patent: Feb. 21, 1995

[54] CEREAL FOOD PRODUCT FOR HOT AND COLD USAGES

[75] Inventors: Victor M. Lewis; David A. Lewis, both of Rushcutters Bay, Australia

[73] Assignee: Byron Agricultural Company Pty. Ltd., Rushcutters Bay, Australia

[21] Appl. No.: 505,034

[22] Filed: Apr. 5, 1990

[51] Int. Cl.$^6$ .......................... A23L 1/10; A23L 1/168
[52] U.S. Cl. ...................... 426/618; 426/457; 426/461; 426/619; 426/620; 426/621; 426/622
[58] Field of Search ............... 426/618, 619, 620, 621, 426/457, 461, 622

[56] References Cited
U.S. PATENT DOCUMENTS 2,526,792 10/1950 Alderman .
4,603,055 7/1986 Karwowski et al. ............... 426/621

FOREIGN PATENT DOCUMENTS 0191676 8/1986 European Pat. Off. .
0216503 1/1987 European Pat. Off. .

Primary Examiner—Donald E. Czaja
Assistant Examiner—Mary S. Mims
Attorney, Agent, or Firm—Scully, Scott, Murphy & Presser

[57] ABSTRACT

The invention concerns a cereal food product comprising a "waxy" cereal chosen from barley, corn, rice or sorghum or from other starchy seed or tissue material wherein less than about 10% of the starch present is amylose, and preferably the starch contains substantially no amylose. Preferably the cereal is waxy barley. The major part of the starch present is also in its ungelatinized form. A process for preparing the food cereal is also described. The cereal food product is preferably a quick cooking hot porridge-like breakfast food.

15 Claims, 1 Drawing Sheet

CEREAL FOOD PRODUCT FOR HOT AND COLD USAGES

BACKGROUND OF THE INVENTION

The present invention concerns a convenient and nutritious food product, prepared from cereals and other starchy seeds or tissues, having predominant use as a hot breakfast cereal as well as other uses.

The base for the food is chosen from any one or more of barley, corn, rice, or sorghum, or other starchy seeds, or food raw materials of a suitable starchy composition.

Starch can be of two types; amylose, and amylopectin. Amylose is a straight chain glucose polymer having $\alpha$ 1,4 linkages. Amylopectin is a branched chain glucose polymer with 1,6 linkages at the branching points. In general, grains will contain both types of starch. Amylose is generally in the minor proportion in grains. However, with certain grains, such as barley, corn, rice, or sorghum there exist certain varieties which contain substantially no amylose or only a very small amount. It is conceivable that plant breeding technique can produce other starch-containing crops having this character.

It has now been found that food products as described herein made from raw materials which contain little or no amylose have unexpected and surprisingly useful advantages over other previously prepared food products of this general type. These low-amylose or amylose-free cereals are known as "waxy" cereals.

Alderman (U.S. Pat. No. 2,526,792) describes the use of waxy grains in flour, grits or wholegrain form or the use of starch derived from these to manufacture crispy ready-to-eat breakfast cereals by a factory process which involved total gelatinisation and a final oven puffing, producing a crispy browned cereal which was reasonably impervious to milk or cream when eaten, thus remaining crispy. Clausi et al (U.S. Pat. No. 2,954,296) used a proportion (5–30%) of pre-gelatinised, optionally waxy-type starchy material to form into pellets with other ingredients, the pellets being gun-puffed to produce low-density, crispy breakfast cereal or snack foods which more faithfully resemble the defined shape of the dough piece. Goering et al (U.S. Pat. No. 4,311,714 & other patents) describe methods for producing from waxy barley grain high maltose syrups, protein, gums etc, using an integrated plant.

Barley is not known to have been reported or used for the manufacture of hot breakfast products of the porridge type. The previous use of barley as a food grain has been limited, and has mostly been used in soups as pearled barley, in beverages as barley water, as a rice extender, (namely rice mixed with pearled barley) in bakery products such as flour, kibbled or whole grain, and in the manufacture of malt for beer and spirits. Barley has also been widely used in the form of malt extract as a flavourant.

In the present specification, the invention is discussed in relation to barley, but the invention is not limited in any way to barley, and also has relevance to corn, rice or sorghum and other starchy seeds or food raw materials which have or may have this characteristic.

SUMMARY OF THE INVENTION

In its broadest form the present invention concerns a food product comprising of cereal chosen from barley, corn, rice or sorghum or from other starchy seed or tissue material wherein less than about 10% of the total starch present is amylose, and preferably the starch contains substantially no amylose. The major part of the starch present is in its ungelatinised form. A process for preparing the food cereal also forms part of the invention. The cereal food product is preferably a quick cooking hot porridge-like breakfast food.

BRIEF DESCRIPTION OF THE DRAWING

The accompanying drawing illustrates the advantages of the present invention.

DETAILED DESCRIPTION OF THE PREFERRED EMBODIMENTS

Figure 1:
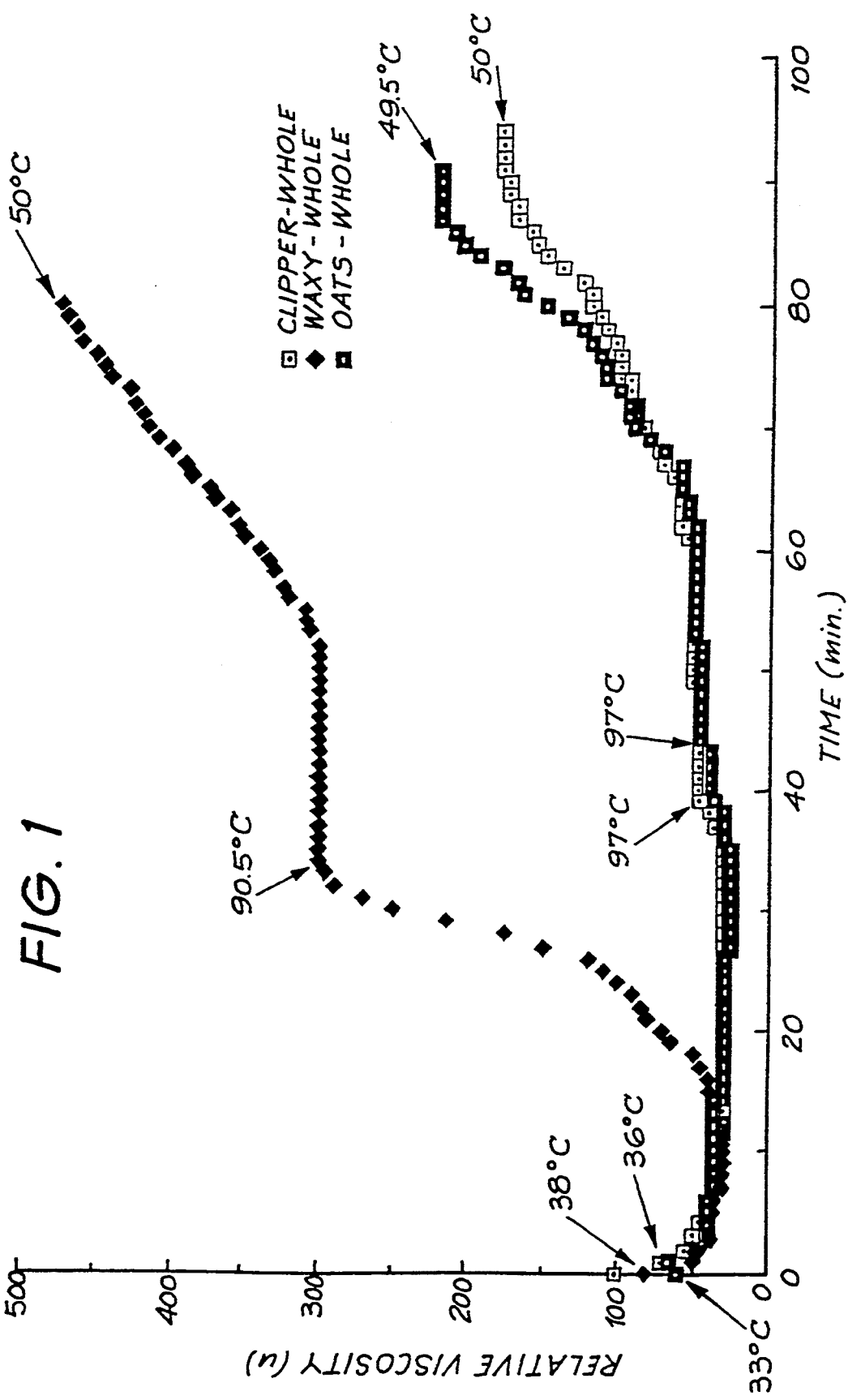
FIG. 1 is a graph (an "amylograph") of three different varieties of flaked cereals comparing relative viscosity of each variety with time.

The food product in its preferred form is a porridge for human consumption. In a most preferred form the food product is a porridge breakfast cereal made from barley containing substantially no amylose.

Barley varieties which have an unusual starch makeup such that all or almost all of the starch present is of the amylopectin type have been developed in some plant breeding programs, but the use of this type of grain is not known to be on a commercial scale. In general, commercial barley varieties may contain 20% to 30% by weight of amylose. The uses of the new types of "waxy" grains which have been envisaged by the plant breeders include the production of amylopectin starch, production of syrups by the hydrolysis of the starch in a manner analogous to their production from corn, and in animal feeds, where it is claimed to enable more complete digestion and energy utilisation. An example of a barley variety of the type which contains essentially all amylopectin and little or no amylose is: Waxy Barley e.g. Waxiro (C.S.I.R.O., Australia)

Similarly, special varieties of rice, corn, and sorghum exist which also contain substantially no amylose. To our knowledge, there has been no use, or understanding that the non-amylose cereal varieties have any advantages or special uses in cereal food products of the type described in the present invention. Some examples are: Waxy Corn, e.g. "84A" (Australia, Dekalb Shand Seed Co.), Waxy Rice, (Many types available in Asian countries), Waxy Sorghum, e.g. "TX-615" (U.S.A.).

The use of these "waxy" grains to prepare the above food products has not been previously described. The food product may be manufactured in the usual manner for manufacturing this type of cereal food product. The cereal may be plasticised as by heat (e.g. steam), flaked or otherwise shaped appropriately and if necessary dried by means commonly known in the art, or by any other suitable sequence of processing steps.

The grains may be heated to soften and plasticise the grains which can then be rolled to produce flakes without breaking. The heating also has the added effect of inactivating enzymes in the grain, and killing insect eggs, for example, which improved storage life. The heating is preferable carried out by means of live steam. The steam only needs to be applied for a relatively short time, for example, from about 5–20 minutes and preferably from about 7–12 minutes at atmospheric pressure. Of course, shorter times can be employed if the steam is superheated and/or at above atmospheric pressure. Other conventional methods of heating such as microwave and oven heating can be employed. The conditions employed in microwave or oven heating should be effective to provide the same degree of plasticizing as achieved by the preferred steam treatment. The cereal grains can be pre-moistened to increase their moisture content. However, steaming does not gelatinise the grains to a large extent. After rolling, the flakes produced are normally dried, sufficiently to produce cereal flakes for packing. Alternatively, instead of whole flakes, granules or flakes in subdivided form may be produced from the treated grain.

The starch present is not gelatinised to a significant extent, so that the major part of the starch is essentially ungelatinised. Preferably less than 30% is gelatinised, and more preferably less than 10% is gelatinised. Ideally, the starch present is substantially not gelatinised.

The novel food product of the present invention provides a very attractive, convenient and good tasting hot breakfast cereal as well as certain novel non-crispy cold breakfast cereal foods. Also, other related food products such as muesli (granola) bars, confectionery, and so on can also be prepared which take advantage of the present invention are superior in many respect to the prior art products; they are significantly more economical to produce and have superior properties as well.

The food product of the present invention when cooked or prepared for consumption is significantly "lighter" in mouth feel and texture on the plate. The product of the present invention is also less sticky of porridgey as compared to comparable products of the prior art made from oats or from non-waxy cereals. This lightness is a physical characteristic such that on an equal-solids preparation basis, the waxy barley is less porridgey or sticky. In addition, the described lightness is consistent with the modern expectation of light foods as being lower in calorie intensity. In particular, the barley product of the invention has a lower calorie intensity because barley is lower in calories than oats as it has a much lower fat content than oats.

A further surprising and unexpected feature of the present invention is that the waxy barley flakes in hot breakfast foods when fully cooked in a comparable way to oat flakes, tend to remain more integral, even though they are extremely tender and easy to consume. The integral character of waxy barley flakes is believed to be derived from the face that since there is little or no amylose present, there is a continuity of amylopectin starch, which gelatinises very readily and in a continuous and unbroken manner in each flake. By contrast, oat flakes, or flakes prepared from regular barely (feed or malting barley) consist of a network of amylose and amylopectin. In comparing these flakes a difference shows vividly in that where amylose is present, the flakes before cooking have a more chalky texture and are more friable and fragile. When dry flakes are tasted, those containing amylose melt on the tongue readily to a raw tasting starchy paste, while flakes prepared from waxy barley or other waxy grains, even though of a very fine caliper, do not melt away on the palate nor do they give a raw starchy flavour. As a consequence of the greater dispersibility of starch from oat flakes or regular (non-waxy) barley flakes, the porridge becomes very sticky and has a marked tendency to stick to the bottom of the cooking vessel and to scorch or burn on to the vessel unless the food is well stirred during cooking. In other words, more of the starch stays within the flakes derived from waxy barley, or other waxy grains, whereas with oats or regular grains, more of the starch disperses into the cooking liquid, creating the problems discussed above.

In addition, it has been surprisingly found that the fully cooked cereal prepared from waxy barley develops a more fully cooked flavour more quickly than oats or regular barley hot cooked cereal. This is believed to be due to the presence in the cooked non-waxy product of harder-to-cook amylose, since starch of this type is usually considered much more difficult to gelatinise and is also slower to gelatinise, than amylopectin. The presence of the relatively less-cooked amylose is evidenced by the more opaque appearance of the cooked hot cereal. The presence of persisting starch granules is shown by microscopic examination.

This is especially important with respect to the production of quick cooking hot cereals. It is clear from our observations that a hot cereal prepared from a waxy grain assumes a cooked flavour and texture after having been heated to a temperature of 70°-80° C. with milk or water. By contrast non-waxy hot cereals require a greater degree of heating—bringing to the boil, then simmering for 5 minutes or more—in order to result in a food with a cooked taste and well thickened texture. In order to achieve quick cooking character in non-waxy-grain-based products it is necessary to increase the degree of pre-cooking and pre-gelatinisation of the flaked cereal at the factory which adds considerably to the cost. Accordingly, a quick-cooking hot cereal can be manufactured more economically from waxy grains than from non-waxy grains.

It is apparent that under the influence of live potable steam, which may be used to condition and heat grains prior to flaking, the waxy grain becomes markedly more plasticised than non-waxy grain. As a consequence of this, the waxy grain can be flaked between smooth flaking rolls to a very fine caliper without the tendency for the grain to shatter. This is even though the grain has not undergone any substantial degree of gelatinisation (see Example 2). By contrast the non-waxy grains have a lesser degree of plasticity under parallel conditions and as a consequence cannot be rolled to flakes of such fine caliper without shattering or becoming powdery and sintered.

It is a further feature and advantage of the present invention that waxy-grain-based hot cereal products are more easily and completely digested, because all the starch becomes well gelatinised during cooking by the consumer. In hot cereal products made from grains containing amylose, the amylose being harder to cook or less gelatinised, is to some degree less digestible than fully gelatinised starch. Clearly, since the amylose content is in the order of 25% of the total starch content in most normal types of grains, then this factor is a relevant one.

The present invention has an unexpected economic advantage, in that cereals prepared from waxy barley of the hulled type, give a yield of 80 to 85% of flakes from raw grain. This is in marked contrast to oats, which gives a yield of flakes of 57% ("Technology Of Cereals", N. L. Kent, Pergamon Press 1966, Page 220 also "Oats: Chemistry And Technology", F. H. Webster Ed., American Association Of Cereal Chemists Inc. 1986, Page 407). Since the farm price in many areas (such as Australia) of oats and barley tends to be similar, it is clearly a considerable economic advantage to utilise barley in the manner described. In addition, the processing of barley according to the preferred methods of the invention, is much more economical and requires less unit operations, machinery and energy inputs. Even greater cost advantages can be achieved by using waxy barley varieties of the naked or hull-less type, from which the yield of food grain suitable for processing is even higher. In this case, the harvested grain is substantially free of any hull material.

A further advantage of waxy barley cereal as compared to oat flakes is that because of the high fat content of oats (7–10%) compared to barley (1–2%) there is a much greater tendency for oat flakes to develop rancidity in storage. Rancidity has always been a problem associated with storage life of packaged oat flakes. This same advantage also applies to other waxy grain varieties.

In addition, because the waxy barley cereal has a less raw or less uncooked flavour than oats, barley cereal in an appropriate processed form may be used as a ready-to-eat non-crispy cold breakfast cereal of a porridge-like consistency without the need to cook the product or to use hot water or milk in its preparation.

The substantial advantages described above in reference to waxy barley as the cereal, will generally also apply to the use of waxy corn, rice, sorghum and other seeds or food raw materials having low or zero content of amylose.

The invention is now described in reference to examples.

EXAMPLE I

Fully cleaned waxy barley grains (1000 g) were peeled free of hull using an abrasive grain peeling device. The degree of peeling was adjusted so that all the hull was removed but there was minimal removal of any bran. The yield of peeled barley on an equal solids basis was 86% as compared to the unpeeled grain. The moisture content of the peeled grain was 10.0% and was adjusted to 15–16% by addition of about 40 ml of water to the grain as it was tumbled in a mixer. The moisture was completely absorbed and was allowed to temper into the grain for at least 1 hour.

The tempered grain was heated in an insulated steamer in live potable steam for 7 minutes. The moisture content increased by 3.5% to 19.5%. The grains were still quite separate and non-cohesive. The steaming-hot barley grains were passed between the smooth rolls of a flaking mill, the gap between the rolls being set at gap of 0.1 mm, the two rolls rotating at the same speed. The grain was thereby converted into fine flakes having marked integral character with little or no breakage of the flakes during rolling and with minimal cracking or disintegration of any of the flakes.

The flakes were dried to 12% moisture and still maintained their integral character.

To cook the flakes, one cup of flakes was added to 1½ cups liquid comprising approximately equal parts milk and hot water, brought to the boil, and then simmered for 1–3 minutes. Even after 1 minute, the flakes of barley were fully cooked and had a pleasing flavour. By stirring the cooked flakes, they could be made to break up easily to form a porridge-like texture.

Alternatively the flakes could be served in a form comprising very soft and tender, substantially integral flakes along with the thickened cooking liquid.

As a further alternative the flakes may be served by placing in a bowl, along with cold milk, then briefly mixing with a spoon before consuming. The flakes have a pleasing mild flavour, with no raw starchy character, and a soft and tender mouth feel.

As a variation to the method described above, unhulled barley may be toasted lightly to induce a slight degree of darkening of the grain, which is then dehulled. This facilitates complete removal of the hull and all its vestiges without undue removal of the bran layer of the grain. It also induces a flavour change which in the finally cooked flakes is perceived as a mild malty sweetness, and a creamy or light brown colour.

As a further variation, flavourings, such as sugar, malt, honey, fruit juices and/or other additives may be added to and absorbed by the product at any suitable stage of the process.

EXAMPLE II

Fully cleaned dehulled oats (groats), malting barley (variety "Clipper") and waxy barley were used in this experiment. The samples of barley were dehulled as described in Example 1. All three grain samples were then processed by pre-dampening, steaming, flaking and drying as described in Example 1. The feed barley and oats produced flakes which were more chalky in appearance, were far more fragile, had a raw starch flavour on the palate and "melted" on the palate readily, when tasted. Waxy barley flakes were more integral, much less fragile, did not have a raw starchy taste and did not "melt" on the palate when tasted.

Measurements were made as to the degree of gelatinisation of the starch in unprocessed grains, in the flakes produced as described, as well as after the flakes had been cooked in milk by simmering 3 and a half minutes. The method used to measure degree of gelatinisation was from "Gelatinisation and In Vitro Digestibility of Starch in Baked Products" by Wootton and Choudhry, Journal of Food Research Vol. 45, p 1783–4 (1980).

| | % Gelatinisation of Each Product | | |
|---|---|---|---|
| | in raw grain | in uncooked flakes | in cooked flakes |
| Oats | 1.40 | 2.6 | 9.9 |
| Barley | 0.2 | 0.8 | 9.8 |
| Waxy Barley | 2.9 | 4.2 | 50.6 |

It is apparent that a porridge prepared from waxy barley is significantly more gelatinised or cooked in a give time than with similarly prepared porridge using oats or barley. Because of the greater degree of gelatinisation of the starch in a waxy barley porridge, it can be expected that the food will be more digestible.

EXAMPLE III

Using flakes of the three types of grains prepared as described in Example II, tests were run using a Brabender Amylograph, in which the materials were subjected to a programmed rate of temperature increase at 1.5° C. per minute with standardised mixing in water, then a holding period, followed by controlled cooling also at 1.5° C. per minute. This type of equipment is widely used in cereal industries and is well known to persons skilled in the art. The viscosity which develops is predominantly a measure of gelatinisation of the starches and is also indicative of the character of the starches being gelatinised. In these tests 4.5% of flaked cereal product was tested in water.

FIG. 1 shows the dramatic contrast in behavior between the whole flakes of the grains tested. The Time (min.) axis on the graph refers to the time which has elapsed from the moment the cereal flakes are added to warm water in the mixer of the Amylograph. The initial temperature at the time of mixing is noted for each curve at the left of the diagram. The data in FIG. 1 clearly show that waxy grain took 36 minutes to reach the inflection point on the curve. This time, at a 1.5° C. increase in temperature per minute plus the starting temperature of 38° C. is the actual observed temperature. The flat part of the curve is a holding phase, i.e., a period where the temperature is held steady. This is followed by a cooling period during which, in these examples, the viscosity increased. Table I below illustrates the program followed for each of the tested grains.

TABLE I

| | Comm. | Heating Time | To | Holding | Cooled to 50° C. over |
|---|---|---|---|---|---|
| Waxy | 38° C. | 36 min. | 92° C. | 15 min. | 28 min. |
| Clipper | 36° C. | 40.7 min. | 97° C. | 15 min. | 31.3 min. |
| Oats | 33° C. | 42.7 min. | 97° C. | 15 min. | 31.7 min. |

It is clearly apparent from FIG. 1 that waxy barley flakes produce a more viscous paste than barley or oat flakes. It is also apparent that a paste viscosity is developed to a degree equivalent to barley or oats at a lower temperature and in a shorter time by the waxy barley flakes.

When these products were examined microscopically after the amylographs were run, (the preparations were stained with iodine), no intact starch granules were seen in the case of waxy barley. With oats and barley intact starch granules were visible. It is theorised that under the conditions of these tests, the less gelatinised amylose in the starch granules of barley and oats acts to hold the granule integral and hence to limit the viscosity which can be achieved.

A variety of modifications to the food products and method disclosed in this specification are believed to be apparent to persons skilled in the art. Accordingly, no limitation upon the invention is intended, except as set further in the claims.

We claim:

1. A processed cereal food product, said product being obtained by treating cereal grains chosen from at least one of barley, corn, rice, sorghum or other starchy grains having an amylose content which is less than about 10% by weight of the total starch content in the grains so as to plasticize the grains, not more than 30% of the total starch content in the grains being gelatinized, and shaping the resultant product.

2. The cereal grain food product of claim 1 wherein said cereal is waxy barley.

3. The cereal food product of claim 1 or 2, wherein said food product is a quick cooking hot porridge-like breakfast food.

4. A process for preparing a waxy grain cereal food product which consists essentially of plasticizing whole waxy grain, without gelatinizing more than 30% of the starch content of said grain, wherein said grain is chosen from waxy barley, waxy corn, waxy rice and waxy sorghum and wherein less than about 10% by weight of the total starch content of said grain is amylose; and then shaping the plasticized material to form integral flakes, granules or flakes in subdivided form, in high yield.

5. A process for preparing a waxy grain cereal food product wherein less than about 10% by weight of the total starch of said waxy grain is amylose which consists essentially of the steps of:
   a. optionally lightly toasting and thereafter optionally dehulling whole waxy grain chosen from waxy barley, waxy corn, waxy rice and waxy sorghum;
   b. pre-moistening and tempering said waxy grain;
   c. plasticizing said tempered waxy grain by steaming such that not more than 30% of the total starch content of said grain is gelatinized;
   d. shaping the plasticized grain to produce integral flakes, granules or flakes in subdivided form; and
   e. drying said integral flakes, granules or flakes in subdivided form, wherein said process is effective to produce said integral flakes, granules or flakes in subdivided form in high yield.

6. The process of claim 4 wherein said plasticizing is conducted by steaming.

7. The process of claim 4 or 5 wherein said plasticized grains are passed between smooth rolls to produce the integral flakes.

8. The process of claim 4 including the additional step of drying the integral flakes.

9. The process of claim 4 which further includes the steps of pre-moistening and tempering the grains before said steaming.

10. The process of claim 9 wherein the waxy grain is lightly toasted and dehulled before the pre-moistening and tempering step.

11. The waxy grain cereal food product of the process of either claim 4 or claim 5.

12. The waxy grain cereal food product of the process of claim 4 or 5 wherein said product is a quick cooking hot porridge-like breakfast cereal.

13. The process of claim 4 or 5 wherein said plasticizing is conducted by microwave or oven heating.

14. The cereal food product of claim 1 wherein said waxy cereal grain contains substantially no amylose.

15. The process of claims 4 or 5 wherein said waxy cereal grain contains substantially no amylose.

* * * * *

UNITED STATES PATENT AND TRADEMARK OFFICE
CERTIFICATE OF CORRECTION

PATENT NO. : 5,391,388
DATED : February 21, 1995
INVENTOR(S) : Victor M. Lewis, et al.

It is certified that error appears in the above-indentified patent and that said Letters Patent is hereby corrected as shown below:

On the Title Page,     Item   "[30]", insert the following:
        --Foreign Application Priority Data
            April 5, 1987   Australia   PJ3510--
        Column 3, line 44:  "face"  should read --fact--

Signed and Sealed this

Nineteenth Day of December, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,391,388
DATED : February 21, 1995
INVENTOR(S) : Victor M. Lewis, et al.

It is certified that error appears in the above-indentified patent and that said Letters Patent is hereby corrected as shown below:

On the Title Page, after Section "[30]", insert the following:   --Foreign Application Priority Date April 5, 1989   Australia   PJ3510--

This certificate supersedes Certificate of Correction issued December 19, 1995.

Signed and Sealed this

Second Day of July, 1996

*Attest:*

BRUCE LEHMAN

*Attesting Officer*   Commissioner of Patents and Trademarks